United States Patent
Farine et al.

[11] Patent Number: 5,978,656
[45] Date of Patent: Nov. 2, 1999

[54] PORTABLE DEVICE USING INDUCTIVE ANTENNA TO RECEIVE DATA TRANSMITTED VIA MODULATING VERTICAL OR HORIZONAL LINE SYNCHRONIZATION SIGNALS OF A SWEPT FRAME VIDEO DISPLAY MONITOR

[75] Inventors: Pierre-André Farine, Neuchâtel; Emil Zellweger, Lommiswil; Alexandre Pollini, Lausanne, all of Switzerland

[73] Assignee: Asulab S.A., Bienne, Switzerland

[21] Appl. No.: 08/761,980

[22] Filed: Dec. 11, 1996

[30] Foreign Application Priority Data

Dec. 28, 1995 [FR] France .................................. 95 15635

[51] Int. Cl.⁶ .................................................. G06F 13/00
[52] U.S. Cl. ................................ 455/41; 455/23; 348/15
[58] Field of Search ..................... 368/327, 10; 348/460, 348/196, 143, 15; 380/25; 395/112; 345/2, 156; 343/714; 455/41, 66, 344, 23

[56] References Cited

U.S. PATENT DOCUMENTS

| | | | |
|---|---|---|---|
| 4,534,012 | 8/1985 | Yokozawa | 368/327 |
| 4,807,031 | 2/1989 | Broughton et al. | 358/142 |
| 4,884,252 | 11/1989 | Teodorisdis et al. | 368/10 |
| 4,979,030 | 12/1990 | Murata | 348/196 |
| 5,128,755 | 7/1992 | Fancher | 348/143 |
| 5,432,851 | 7/1995 | Scheidt et al. | 380/25 |
| 5,488,571 | 1/1996 | Jacobs et al. | 364/705.07 |
| 5,570,297 | 10/1996 | Brzezinski et al. | 395/112 |
| 5,594,462 | 1/1997 | Fishman et al. | 345/2 |
| 5,627,552 | 5/1997 | Farrar et al. | 343/718 |
| 5,652,602 | 7/1997 | Fishman et al. | 345/156 |
| 5,737,699 | 4/1998 | Farrar et al. | 455/344 |
| 5,793,419 | 8/1998 | Fraley | 348/143 |
| 5,815,127 | 9/1998 | Jacobs et al. | 345/2 |

FOREIGN PATENT DOCUMENTS

| | | |
|---|---|---|
| 639 236 | 11/1983 | Switzerland . |
| WO-A-9515057 | 6/1995 | WIPO . |
| WO-A-9533316 | 12/1995 | WIPO . |

*Primary Examiner*—Le Hien Luu
*Attorney, Agent, or Firm*—Griffin, Butler, Whisenhunt & Szipl, LLP

[57] ABSTRACT

Data transmission system comprising a data transmitter (1) including:
- swept frame display means (2), and
- a generator of composite video signals (20, 22) to control the operation of said swept frame display means (2); and
- a portable information detection device (7) for receiving said transmitted data by said data transmitter (1).

The data transmitter (1) further comprises means (23) for modulating at least one of the elementary signals constituting said composite video signals with the data to be transmitted, and said information detection device (7) further comprises any inductive antenna (44, 45) for detecting said modulated elementary signal.

13 Claims, 3 Drawing Sheets

PORTABLE DEVICE USING INDUCTIVE ANTENNA TO RECEIVE DATA TRANSMITTED VIA MODULATING VERTICAL OR HORIZONAL LINE SYNCHRONIZATION SIGNALS OF A SWEPT FRAME VIDEO DISPLAY MONITOR

BACKGROUND OF THE INVENTION

The present invention concerns a data transmission system comprising a data transmitter and a portable information detection device for receiving the data transmitted by the data transmitter. In particular, the invention concerns such a data transmission system in which the data transmitter includes swept frame display means and a generator composite video signals for controlling the operation of the swept frame display means.

The present invention may be used in the field of the transmission of data from a computer, including a swept frame monitor, and a watch receiver, the invention being described hereafter in relation to this exemplary application to which it is nevertheless not limited.

Data transmission systems such as defined hereabove are already known. Patent application WO 95/15057 in the name of Timex Corporation, for example, describes a system for the transmission of data from a computer to a watch receiver. The monitor is equipped with a video signal generator which effectuates a swept frame of the screen. The data is transmitted to the watch receiver by modulating the luminosity of the screen during the frame sweeping so as to generate light pulses corresponding to the binary information of the data. The watch receiver includes a photo detector fixed on its case for detecting the transmitted light pulses.

However, such a system has a number of inconveniences. Firstly, the photo detector requires a precise orientation with respect to the screen of the swept frame monitor to be able to detect the transmitted light pulses. Such a system also requires the placement of a supplementary element on the exterior surface of the watch receiver, namely the photodetector. This often poses problems during the conception of the wrist watch, taking its small dimensions.

Another problem is related to the fact that the data transmission takes place by a variation in the luminosity of the screen of the monitor. This transmission is likely to be perceptible and thus troublesome to the user.

In addition, the luminosity of the screen may be varied by the user on most monitors available commercially. Due to this fact, the correct transmission of the data by variation of this luminosity is not always achieved by such this system.

Thus, an aim of the present invention is to supply a data transmission system of the type defined hereabove which overcomes or ameliorates the inconveniences of the prior art.

Moreover, an aim of the invention is to supply such a data transmission system whose realisation is simple, viable and not cumbersome.

In addition, an aim of the invention is to supply such a data transmission system whose realisation requires only a minimal number of elements.

SUMMARY OF THE INVENTION

With this in mind, the present invention provides a data transmission system comprising, firstly, a data transmitter including swept frame display means, and a composite video signal generator for controlling the operation of said swept frame display means and, secondly, a portable information detection device intended to receive said transmitted data by said data transmitter, characterised in that said data transmitter further comprises means for modulating at least one of the elementary signals constituting said composite video signals with said data to be transmitted, and in that said portable information detection device further comprises an inductive antenna to capture said modulated elementary signal.

Due to this combination of features, the portable information detection device does not require a particular orientation with respect to the screen of the monitor to be able to detect the transmitter data. Furthermore, no supplementary element need be placed on the exterior surface of the portable information detection device.

BRIEF DESCRIPTION OF THE DRAWINGS

Other characteristics and advantages of the invention will appear more clearly from a reading of the detailed description which follows, made with reference to the annexed drawings, representing an example only of an embodiment of the data transmission system of the invention, and in which.

DETAILED DESCRIPTION OF THE INVENTION

Figure 1:
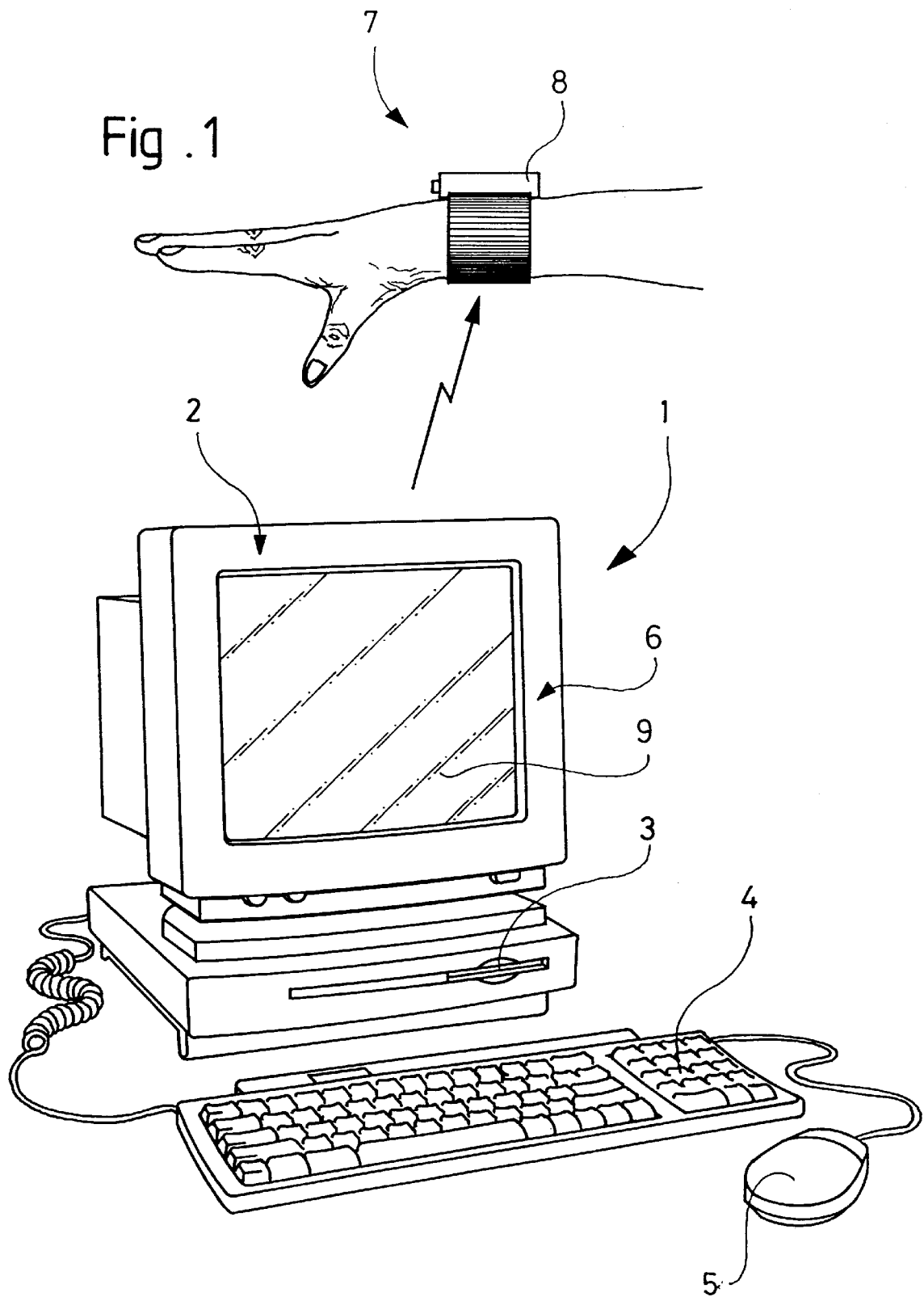
FIG. 1 is a global representation of a data transmission system according to the present invention.

FIG. 1 shows a data transmitter 1 including a swept frame display means 2. In this realisation, the data transmitter 1 is constituted by a conventional computer 3, a keyboard 4 and a mouse 5, whilst the display means 2 are constituted by a cathode ray tube monitor 6.

Moreover, FIG. 1 shows a portable information detection device 7 intended to receive the data from the data transmitter 1. In the present example, the portable information detection device 7 is constituted by a wrist watch 8 worn of the forearm on a user.

The monitor 6 includes a conventional screen 9 in which visual images are displayed, this latter being reconstituted on the phosphor screen 9 from composite electric video signals.

The data transmitted to the wrist watch 8 may be generated in the computer 3. Alternatively, the data may be received asynchronously from an external source, such as a modem connected to a remote data source. If the monitor 6 is a video display of a television, the data source may be the input of an antenna or a cable which is connected to emit control means which appear on the screen 9.

As is known, in each image may be defined by mathematical luminosity function B (x, y, t) which depends on three variables: the horizontal coordinate x, the vertical coordinate y and the time t. Each image may thus be decomposed into a series of predetermined and systematic waveforms which may be reconstituted on the screen 9 so as to reproduce a replica identical to the original image. To make such a reproduction, the monitor 6 includes an electron gun (not shown), which produces an electron beam. When the electron beam strikes the interior surface of the screen, the phosphor of this point emits electromagnetic radiation in the visible frequency range. Thus, the intensity of the beam controls the luminosity of the screen at this point. The trajectory of the electron beam is controlled to determine the horizontal coordinate x and the vertical coordinate y of the point of the screen which is momentarily activated at a time t. Thus, the electron beam traces a systematic line on the screen 9 which enables the reconstitution of the desired image.

Figure 2:
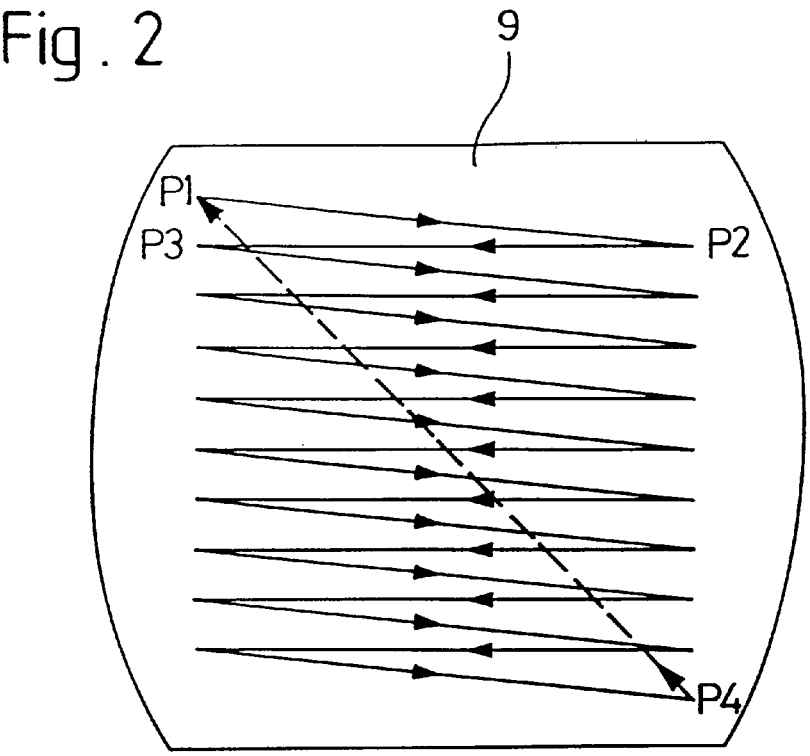
FIG. 2 is a functional schematic diagram of a swept frame monitor of the data transmitter which forms part of the data transmission system of FIG. 1.

An example of a monitor which can be found in commerce is a SVGA monitor (which is an acronym of the phrase "Super Video Graphic Adapter"). An image reconstituted on the screen of an SVGA monitor comprises 600 lines of which approximately 570 are active in the synthesis of the image. As is represented in FIG. 2, an electron beam is thus swept from left to right on each of these 570 lines, line by line and from the top to the bottom of the screen, in order to synthesis the desired image.

A composite video signal is generated to control the operation of the monitor 6. Such a composite video signal is constituted by a number of elementary signal, that is a video signal, a suppression signal and line synchronisation signals.

Figure 3:
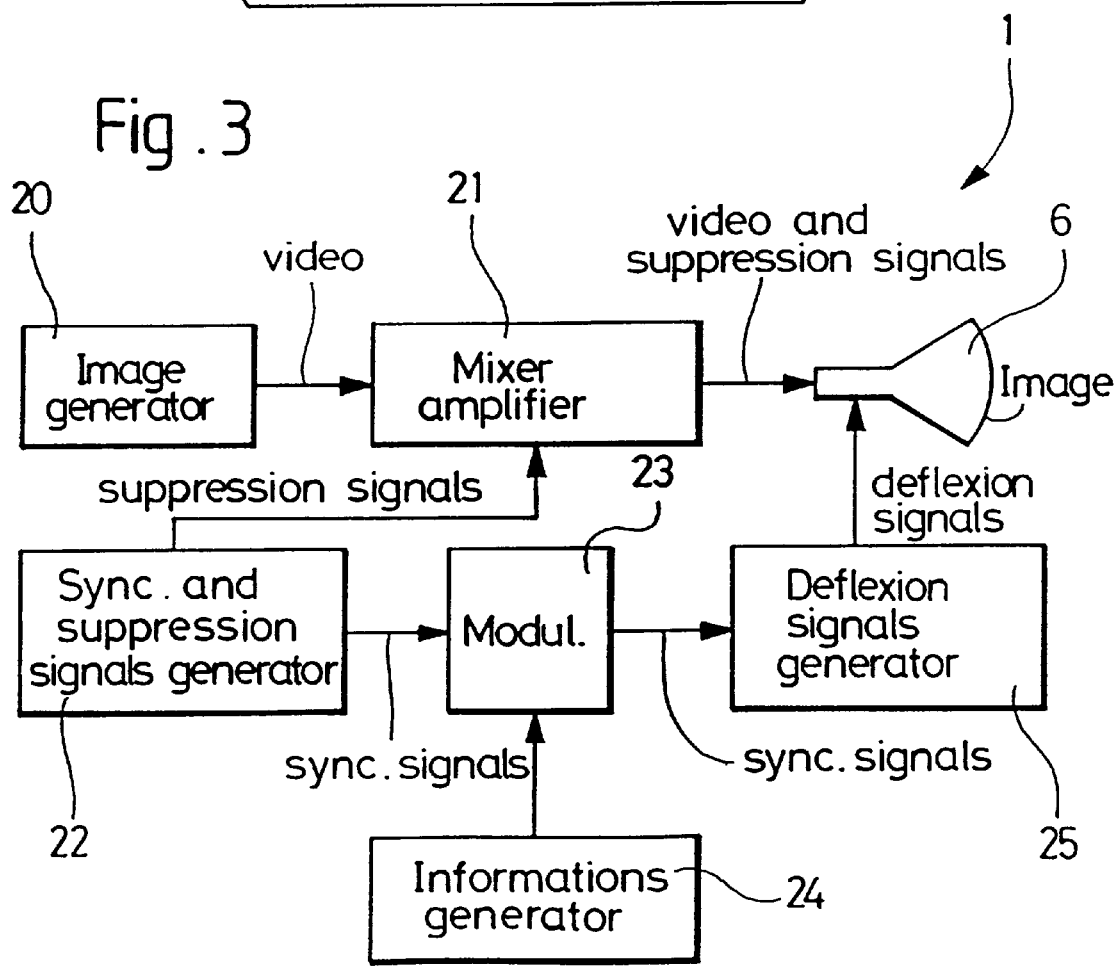
FIG. 3 is a schematic diagram of the data transmitter forming part of the data transmission system of FIG. 1.

Referring now to FIG. 3, there can be seen a partial schematic diagram of an embodiment of the data transmitter 1 and the swept frame monitor 6. In this example, the data transmitter 1 comprises a composite video signal generator constituted by an image generator 20 and a synchronisation and suppression signal generator 22. The data transmitter 1 further comprises a mixer/amplifier 21, a modulator 23, a data generation circuit 24, a deflection signal generator 25 and the monitor 6. These elements will be described in relation to FIG. 4, which shows, in a simplified and schematic manner, waveforms at different points of the data transmitter of FIG. 3.

The image generator 20 generates video signals each comprising a series of predetermined waveforms which may be reconstituted on the screen 9 by a swept frame in order to produce a desired image. An example of such a series of waveforms is shown in FIG. 4 by the waveform referenced D.

Figure 4:
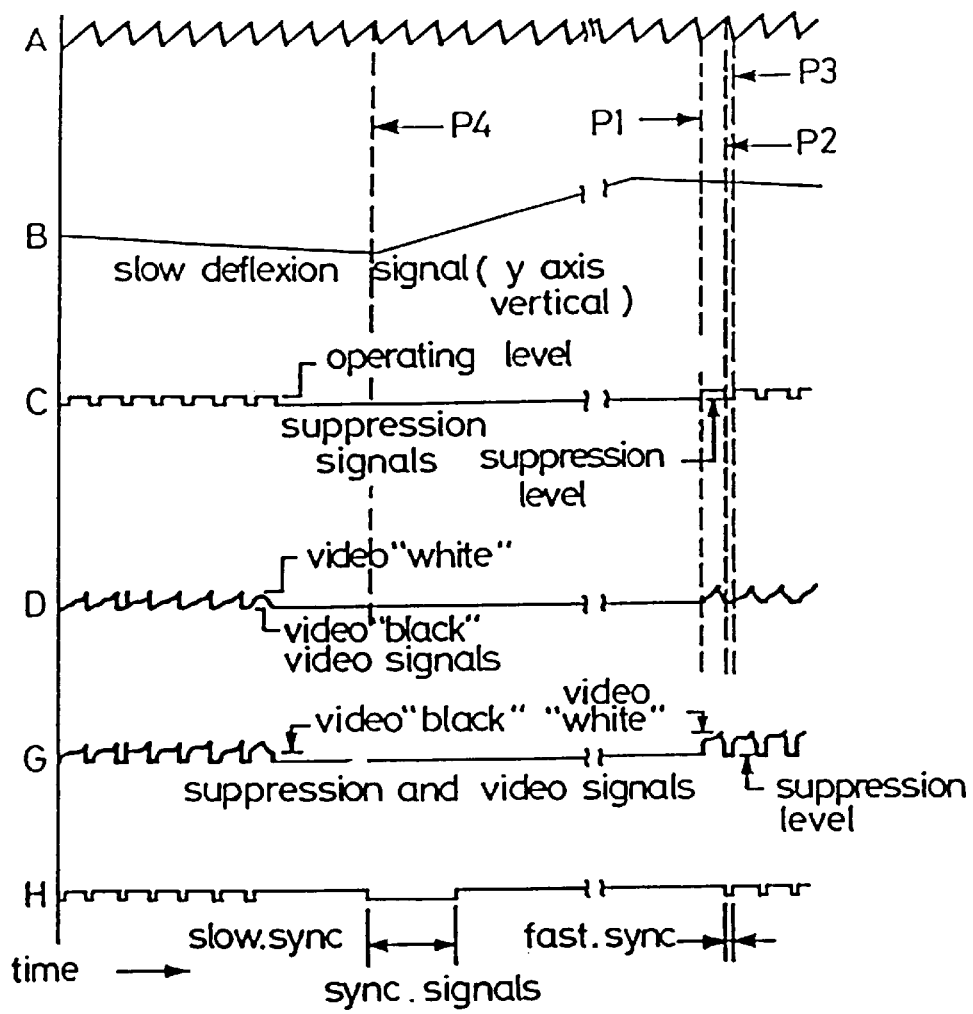
FIG. 4 schematically represents waveforms at different locations of the data transmitter forming part of the data transmission system of FIG. 1.

The synchronisation and suppression signal generator 22 generates, firstly, suppression signals, such as the waveform represented in FIG. 4 by the reference C, so that the electron gun may be deactivated during the return of the electron bean from the end of the line of a frame to the start of the next line, for example, between the points P2 and P3 of FIG. 2. Similarly, the electron beam is also deactivated during the return of the electron beam from the end of the last line of a frame to the start of the first line of the next frame, for example, between the point P4 and P1 of FIG. 2.

The suppression signals from the synchronisation and suppression signals generator 22 are mixed with the output signals of the image generator 20 by the mixer/amplifier 21. Thus, a composite video signal, such as the waveform referenced G on FIG. 4, is supplied to the video input of the swept frame monitor 6.

The synchronisation and suppression signal generator 22 generates, firstly, a group of horizontal and vertical synchronisation signals, such as the waveforms represented in FIG. 4 by the reference H. These horizontal and vertical synchronisation signals determine respectively the start of the horizontal and vertical deflection waveforms.

The horizontal and vertical synchronisation signals are used to synchronize the operation of the deflection signal generator 25. This later generates two series of sawtooth pulses which controls the deflection of the electron beams respectively along the horizontal and vertical axis. In this respect, the rapid deflection of the electron beam along the horizontal axis is controlled by a first deflection wave form, referenced A on FIG. 4. Similarly, the slower deflection of the electron beam along the vertical axis is controlled by a second deflection waveform, referenced B in FIG. 4. As can be seen in this figure and in FIG. 2, the horizontal line synchronisation pulses determine the start (for example, point P1) of each sawtooth pulse forming part of the waveform A, whilst the vertical line synchronisation pulses determine the end (for example, point P4) of each sawtooth pulse forming part of the wave form B.

The repetition frequency of the line synchronisation signals varies according to the swept frame display means in question. Amongst the swept frame monitors currently available commercially, a VGA monitor has a horizontal synchronisation signal having a frequency of approximately 31 kHz, a CGA monitor (from the phrase "Colour Graphic Adapter") has a horizontal synchronisation signal having a frequency of approximately 15 kHz, an EGA monitor (from the phrase "Enhanced Graphic Adapter") has a horizontal synchronisation signal of approximately 21 kHz, a SVGA (from the phrase "Super Video Graphic Adapter") has a horizontal synchronisation signal having a frequency which is approximately 47 kHz and a 14 inch Macintosh® monitor has a horizontal synchronisation signal having a frequency of approximately 43 kHz. In general, the frequency of the horizontal synchronisation signals of swept screen monitors available commercially is between 10 kHz and 100 kHz.

The data generator 24 generates, in this example, a series of pulses whose amplitude represents a binary value. Thus, the series of pulses contains binary information corresponding to the data which will be transmitted to the watch receiver 8 of FIG. 1. The information transmitted by the data transmitter 1 may be used for different functions. In the described example, it may concern the adjustment of the frequency or the time setting of the wrist watch 8. It may also be used to program the alarm times of the wrist watch 8. One can also envisage the case where the computer 3 is used as an electronic agenda and the wrist watch 8 as a portable reminder device, this latter being directly programmed by the data transmitter.

The modulator 23 mixes the output signals of the data generator 24 and the synchronisation and suppression signal generator 22 such that the horizontal line synchronisation signals have an amplitude modulated by the series of pulses corresponding to the data to be transmitted to the wrist watch 8.

However, the present invention may also applied to other modulation techniques for example, frequency shifting, phase shifting, etc.

In the described example, the wrist watch 8 includes at least one analogue display. Analogue display hand are driven by a stepper motor whose coil is also used as a part of the antenna which detects the data from the data transmitter 1. It is also possible to use as data detector another coil already incorporated in a portable information detection device, for example a voltage multiplier coil for supplying power to a piezo electric alarm, or the coil of an electrodynamic alarm, equipping alarm watches. Moreover, it is possible to use any other coil capable of being incorporated in a portable information detection device.

Figure 5:
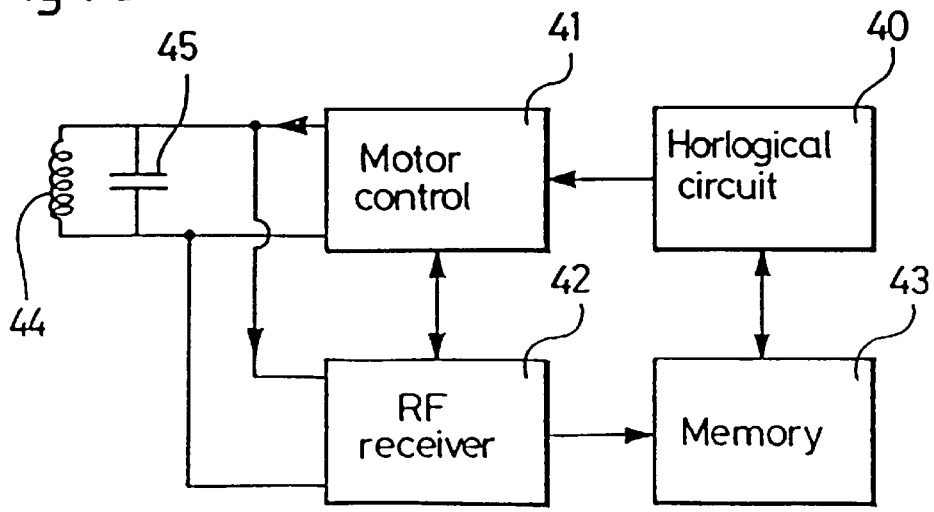
FIG. 5 is a schematic diagram of the portable information detection device forming part of the data transmission system of FIG. 1.

In FIG. 5, only the principal functional blocks of the wrist watch 8 which play a role in the operation of the present invention are represented. Thus, it can be seen in this figure that the wrist watch 8 comprises a horological circuit 40, a motor control circuit 41, a receiver 42, a memory device 43, the coil 44 of a step motor associated with an analogue horological display (not represented) and a capacitor 45.

The horological circuit 40 delivers signals at a precise frequency to the motor control circuit 41. Next, this latter applies motor pulses to the coil 44 to advance at a predetermine angular speed this stepper motor of which it forms part. The analogue horological display associated with the stepper motor indicates the passage of time corresponding to this angular speed.

The receiver 42 is connected to two terminals of the coil 44 to be able to detect the data which is detected by the coil 44. The capacitor 45 is connected in parallel to the coil 44 to adjust the resonant frequency of this later. The memory device 43 is connected to the receiver 42 to be able to store data deliver by this later.

The operation of elements 40 to 45 will be described in more details. Swiss patent No 639 236 describes a watch receiver whose coil of the stepper motor forms part of an antenna to capture the information which is transmitted to it. A person skilled in the art would have no difficulty in adapting such a watch receiver so that it fulfils the described function.

As an example, the coil of a Lavet type stepper motor typically has an inductance L of 1 H and a resistance R of 1600 Ω. Now, the resonant frequency f of resonance of an inductive antenna is given by the following formula:

$$f = \frac{1}{2\pi\sqrt{LC}}$$

where C is the value of the capacitance across the terminals of the antenna.

In the case of a horizontal line synchronisation signal of a VGA monitor, the frequency of repetition of this signal is approximately 31,8 kHz. In order that the inductive antenna shown in FIG. 5 resonates at this frequency, the capacity C of the capacitor 45 must have a value of approximately 25 pF.

In the case of CGA, EGA, SVGA and Macintosh® monitors cited hereabove as examples, the capacitance C of the capacitor 45 must have a value respectively of approximately 104 pF, 57 pF, 11 pF and 14 pF.

Advantageously, such capacitors may be easily realised in the form of integrated circuits. This represents a real advantage of size, and notably in the case where at least one of the other elements of the watch represented in FIG. 5, for example the horological circuit 40, the motor control circuit 41, the receiver 42 and the memory device 43, are also realised in the form of an integrated circuit. In this case, the capacitor 45 may be incorporated in the watch receiver without requiring supplementary space in this latter or supplementary fabrication steps.

Moreover, the quality factor Q of the L-C couple is given by the following formula:

$$Q = 2\pi f \frac{L}{R}$$

In the example of the described VGA monitor, the value of this quality factor is 125. Such an antenna is thus well adapted to detect a signal having the frequency of the horizontal line synchronisation signal mentioned above.

Finally, it is to be noted that various modifications and/or improvements may be made to the data transmission system according to the invention without departing from the ambit thereof.

In this regard the description referred to the modulation of the horizontal line synchronisation signal to transmit data to a portable information detection device. It is nevertheless possible to modulate other signals forming part of the composite video signal such as the vertical line synchronisation signal, the video signal or the line suppression signal, where even any other repetitive signal which is associated with the operation of the swept frame display means, to transmit this same data, providing that the resonant frequency of the inductive antenna of the portable information device is adapted thereto.

The person skilled in the art would have no trouble to modify the embodiment of the invention shown in FIGS. 3 and 4 in order to effectuate such a modification. For example, the modulator 24 may be connected to the output of the image generator 20 and the input of the mixer/amplify 21 if one wishes to modulate the video signal.

What is claimed is:

1. A data transmission system comprising a data transmitter (1) and a portable information detection device (7) capable of receiving data transmitted by said data transmitter (1), wherein said data transmitter (1) comprises
swept frame display means (2),
a composite video signal generator (20, 22) comprising a vertical and/or horizontal line signal generator to control the operation of said swept frame display means (2), and
modulation means (23) of at least one of the elementary signals constituting said composite video signals with said data to be transmitted, said modulation means (23) being adapted to modulate one of said line synchronization signals;

and wherein said portable information detection device (7) intended to receive said data transmitted by said data transmitter (1) comprises
an inductive antenna (44, 45) to detect said modulated line synchronization signal.

2. The data transmission system according to claim 1, wherein said modulation means (23) are adapted to modulate said horizontal line synchronization signal.

3. The data transmission system according to claim 2, wherein said portable information detection device (7) further comprises
analogue display means, and
a stepper motor to control said analogue display means, said inductive antenna (44, 45) comprising a coil of said stepper motor.

4. The data transmission system according to claim 2, wherein said inductive antenna (44, 45) further comprises a capacitor realized in a form of an integrated circuit.

5. The data transmission system according to claim 1, wherein said modulation means (23) are adapted to modulate the amplitude of said modulated line synchronization signal.

6. The data transmission system according to claim 5, wherein said modulation means (23) are adapted to modulate said vertical line synchronization signal.

7. The data transmission system according to claim 5, wherein said portable information detection device (7) further comprises analogue display means, and a stepper motor to control said analogue display means, said inductive antenna (44, 45) comprising a coil of said stepper motor.

8. The data transmission system according to claim 5, wherein said inductive antenna (44, 45) further comprises a capacitor in a form of an integrated circuit.

9. The data transmission system according to claim 1, wherein said portable information detection device (7) further comprises analogue display means, and a stepper motor to control said analogue display means, said inductive antenna (44, 45) comprising a coil of said stepper motor.

10. The data transmission system according to claim 9, wherein said inductive antenna (44, 45) further comprises a capacitor in a form of an integrated circuit.

11. The data transmission system according to claim 1, wherein said inductive antenna (44, 45) further comprises a capacitor in a form of an integrated circuit.

12. The data transmission system according to claim 11, wherein the frequency of said modulated lines synchronization signal is between 10 kHz and 100 kHz.

13. The data transmission system according to claim 1, wherein the frequency of said modulated lines synchronization signal is between 10 kHz and 100 kHz.

* * * * *